United States Patent
Wang et al.

(10) Patent No.: US 9,456,417 B2
(45) Date of Patent: Sep. 27, 2016

(54) METHOD AND DEVICE FOR INCREASING PERFORMANCE IN A RADIO COMMUNICATION SYSTEM

(71) Applicant: Telefonaktiebolaget L M Ericsson (publ), Stocholm (SE)

(72) Inventors: Xiaohui Wang, Lund (SE); Conor White, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 84 days.

(21) Appl. No.: 14/367,597

(22) PCT Filed: Dec. 11, 2012

(86) PCT No.: PCT/EP2012/005105
§ 371 (c)(1),
(2) Date: Jun. 20, 2014

(87) PCT Pub. No.: WO2013/097924
PCT Pub. Date: Jul. 4, 2013

(65) Prior Publication Data
US 2015/0223171 A1   Aug. 6, 2015

Related U.S. Application Data

(60) Provisional application No. 61/581,141, filed on Dec. 29, 2011.

(30) Foreign Application Priority Data

Dec. 27, 2011   (EP) .................................... 11195799

(51) Int. Cl.
*H04W 52/02* (2009.01)
*H04W 76/04* (2009.01)
*H04W 88/02* (2009.01)

(52) U.S. Cl.
CPC ....... *H04W 52/0235* (2013.01); *H04W 76/045* (2013.01); *H04W 76/046* (2013.01); *H04W 52/0216* (2013.01); *H04W 88/02* (2013.01); *Y02B 60/50* (2013.01)

(58) Field of Classification Search
None
See application file for complete search history.

(56) References Cited

U.S. PATENT DOCUMENTS 6,212,175 B1    4/2001  Harsch
6,720,823 B1 *  4/2004  Rautiainen ............ H04W 84/14
                                          455/426.2

(Continued)

FOREIGN PATENT DOCUMENTS

EP     1622400 A1    2/2005
WO  2010057161 A1    5/2010

OTHER PUBLICATIONS

Lagar-Cavilla, H. A. et al., "Traffic Backfilling: Subsidizing Lunch for Delay-Tolerant Applications in UMTS Networks", Mobiheld, Cascais, Portugal, 2011, pp. 1-5.

(Continued)

*Primary Examiner* — Lester Kincaid
*Assistant Examiner* — Daniel G Bassett
(74) *Attorney, Agent, or Firm* — Murphy, Bilak & Homiller, PLLC

(57) ABSTRACT

The present invention relates to a method and a device for increasing performance in a radio communication system (12). The method comprises obtaining an indication that it is desirable to avoid that a communication terminal (5) of the system (12) enters a power saving mode, the power saving mode being entered upon expiry of a timer of the communication terminal (5). The method further comprises allowing a scheme of scheduled periodic exchange of data between the communication terminal (5) and a node (8) of a network (10) of the system (12), intended to periodically reset the timer before its expiry by means of said periodic exchange of data. The method also comprises exchanging data between the communication terminal (5) and the network node (8) over a radio interface (11) in accordance with the scheme, whereby entry of the communication terminal (5) into the power saving mode is prevented.

20 Claims, 3 Drawing Sheets

(56) References Cited

U.S. PATENT DOCUMENTS

| | | | |
|---|---|---|---|
| 2005/0141541 A1 | 6/2005 | Cuny et al. | |
| 2007/0217433 A1* | 9/2007 | Doppler | H04W 40/246 370/400 |
| 2008/0014938 A1* | 1/2008 | Hart | H04W 76/04 455/435.1 |
| 2009/0287827 A1* | 11/2009 | Horn | H04W 8/005 709/227 |
| 2010/0124211 A1* | 5/2010 | Payyappilly | H04W 76/045 370/338 |
| 2010/0290378 A1* | 11/2010 | Wu | H04W 52/0216 370/311 |
| 2011/0038347 A1* | 2/2011 | Patil | H04W 36/0055 370/331 |
| 2011/0093542 A1 | 4/2011 | Lau et al. | |
| 2011/0153525 A1* | 6/2011 | Benco | H04W 52/0225 455/456.1 |

OTHER PUBLICATIONS

Qian, Feng et al., "Characterizing Radio Resource Allocation for 3G Networks", IMC'10, Melbourne, Australia, Nov. 1-3, 2010, pp. 137-150.

Unknown, Author, "Network Efficiency Task Force Fast Dormancy Best Practices", GSM Association, V1.0, May 26, 2010, pp. 1-21.

Unknown, Author, "Understanding Smartphone Behavior in the Network", Nokia Siemens Networks Smart Labs, White Paper, 2011, pp. 1-12.

Unknown, Author, "Why Smartphones Need Smart Networks", Ericsson AB, 2011, pp. 1-5.

* cited by examiner

METHOD AND DEVICE FOR INCREASING PERFORMANCE IN A RADIO COMMUNICATION SYSTEM

TECHNICAL FIELD

The invention relates to a method and device for increasing performance in a radio communication system wherein a wireless communication terminal of the system may enter a power saving mode.

BACKGROUND

In order to reduce the power consumption in mobile phones, and thus extend the battery time, the phone is often programmed to switch to a power saving mode such as to IDLE state or to the UTRAN Routing Area Paging Channel (URA-PCH) when there is no exchange of data with the network (e.g. in accordance with so called Fast Dormancy). Thus, when the Radio Link Control (RLC) buffer is empty, a timer starts running and, when it expires, the phone is switched to the IDLE state or the URA-PCH. An example of such a power saving mode is Fast Dormancy.

Switching the phone to URA-PCH instead of to IDLE state avoids some problems in the network signaling and also allows the phone to more quickly be brought back to the connected states CELL-FACH or CELL-DCH. However, since it normally takes much longer time for a user to prepare the content to send than for the phone to establish the connections to the network, the gain may not really be noticeable in practice. For a Mobile Terminated event, since the phone in URA-PCH is known to the network on the Routing Area (RA) level, the paging procedure, including reading the paging indicator and the following paging message, and then setting up the RRC connections, has to be performed on the same level. This can cause network access congestion, collision of the Random Access Signatures, missed detection or false alarm of the Acquisition Indications, and delays when many handsets in the same RA are to exchange important messages simultaneously. This in its turn can be damaging to business dependent on high frequency communications or a threat to life and properties in the occurrence of tsunami or the like while the warning system is still in its infancy.

SUMMARY

It is an objective of the present invention to at least alleviate a problem with the prior art.

According to an aspect of the present invention, there is provided a method for increasing performance in a radio communication system. The method comprises obtaining an indication that it is desirable to avoid that a communication terminal of the system enters a power saving mode, the power saving mode being entered upon expiry of a timer of the communication terminal. The method further comprises allowing a scheme of scheduled periodic exchange of data between the communication terminal and a node of a network of the system, intended to periodically reset the timer before its expiry by means of said periodic exchange of data. The method also comprises exchanging data between the communication terminal and the network node over a radio interface in accordance with the scheme, whereby entry of the communication terminal into the power saving mode is prevented.

According to another aspect of the present invention, there is provided a device for increasing performance in a radio communication system. The device comprises means for obtaining an indication that it is desirable to avoid that a communication terminal of the system enters a power saving mode, the power saving mode being entered upon expiry of a timer of the communication terminal. The device also comprises means for allowing a scheme of scheduled periodic exchange of data between the communication terminal and a node of a network of the system, intended to periodically reset the timer before its expiry by means of said periodic exchange of data. The device further comprises means for exchanging data between the communication terminal and the network node over a radio interface in accordance with the scheme, whereby entry of the communication terminal into the power saving mode is prevented.

According to another aspect of the present invention, there is provided a device for increasing performance in a radio communication system. The device comprises indication obtaining circuitry configured for obtaining an indication that it is desirable to avoid that a communication terminal of the system enters a power saving mode, the communication terminal being configured for entering said power saving mode upon expiry of a timer of said communication terminal. The device also comprises a processing unit configured for allowing a scheme of scheduled periodic exchange of data between the communication terminal and a node of a network of the system, wherein the exchange of data is intended to periodically reset the timer before its expiry by means of said periodic exchange of data. The device further comprises data exchange circuitry configured for exchanging data between the communication terminal and the network node over a radio interface in accordance with the scheme.

Any of the device aspects of the present invention may be used for performing the method aspect of the present invention.

According to another aspect of the present invention, there is provided a communication terminal comprising the device of any of the device aspects above.

According to another aspect of the present invention, there is provided a network node comprising the device of any of the device aspects above.

According to another aspect of the present invention, there is provided a radio communication system comprising a communication terminal, a network and the device of any of the device aspects above.

According to another aspect of the present invention, there is provided a computer program for increasing performance in a radio communication system. The computer program comprises computer program code which, when run on a device of the radio communication system, causes said device to obtain an indication that it is desirable to avoid that a communication terminal of the system enters a power saving mode, the power saving mode being entered upon expiry of a timer of the communication terminal. The device is also caused to allow a scheme of scheduled periodic exchange of data between the communication terminal and a node of a network of the system, intended to periodically reset the timer before its expiry by means of said periodic exchange of data. The device is further caused to exchange data between the communication terminal and the network node over a radio interface in accordance with the scheme, whereby entry of the communication terminal into the power saving mode is prevented.

The computer program aspect of the present invention may be run on a device of any of the device aspects above. The computer program aspect of the present invention may be used to perform the method aspect above, e.g. by being run on a device of any of the device aspects above.

According to another aspect of the present invention, there is provided a computer program product comprising a computer program of the computer program aspect above and a computer readable means on which the computer program is stored.

According to another aspect of the present invention, there is provided a computer program product comprising computer-executable components for causing a device for increasing performance in a radio communication system to perform the method of the method aspect above when the computer-executable components are run on a processing unit included in the device.

It is an advantage of the present invention of any of the aspects above that a wireless communication terminal may be prevented from entering a power saving mode if desired, why the terminal may e.g. be allowed to maintain an active connection to a network node, e.g. in a CELL-FACH (Forward Access Channel) or CELL-DCH (Dedicated Channel) state, instead of e.g. switching to IDLE state or the UTRAN Routing Area Paging Channel (URA-PCH) after expiry of the timer. Thus, the terminal may stay prepared to e.g. exchange latency critical messages while signaling for connecting the terminal from a power saving mode may be reduced or avoided, reducing the risk of network access congestion, delays and the like. This may be very advantageous in e.g. a business dependent on high frequency communication such as stock trading or for e.g. receiving widely distributed warning messages in case of a catastrophic event such as a tsunami or the like.

The discussions above and below in respect of any of the aspects of the invention is also in applicable parts relevant to any other aspect of the present invention. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which.

DETAILED DESCRIPTION

Figure 1:
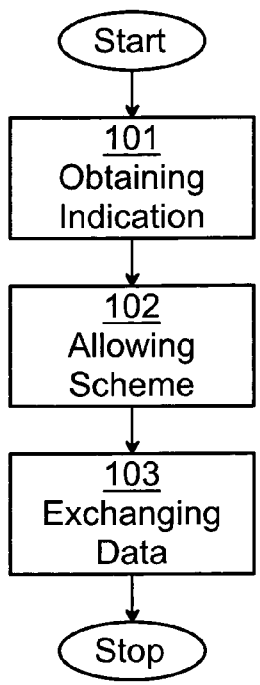
FIG. 1 is a schematic flow chart illustrating an embodiment of a method of the present invention.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The communication terminal discussed herein is set to enter a power saving mode upon expiry of a timer of the terminal, e.g. in accordance with a prior art fast dormancy procedure. The timer may typically be started when the Radio Link Control (RLC), or similar, buffer is empty and runs for a pre-defined period of time until it expires and the terminal switches to the power saving mode, such as to IDLE or URA-PCH. However, if data is exchanged, sent or received, by the terminal, the timer may be reset. The power saving mode is thus entered after a certain period of inactivity, as governed by the timer. In accordance with the present invention, data is scheduled to be exchanged periodically such that the tinier is reset every time before it expires, thus preventing the terminal from entering into the power saving mode which it is to enter upon the expiry of the timer.

The method of the present invention may in different embodiments of the invention, depending on e.g. the configuration of the communication system, be performed either in a communication terminal or in a network to which the communication terminal is associated, such as in a network node of the network. Thus, the communication terminal may handle the control of its entering into the power saving mode by itself, without obtaining permission or otherwise involving the network. This may be advantageous since no changes in the communication standards need to made. If, on the other hand, the network is involved, changes to the standard may be needed, but this may still be advantageous to allow the network to control whether or not a communication terminal should be allowed to stay connected instead of entering a power saving mode. Whether or not a communication terminal may be allowed by the network to stay connected instead of entering a power saving mode may then e.g. be dependent on whether the subscription for the communication terminal allows it, on whether there are enough available resources in the network and/or on the expected duration of the connected, none-power saving, mode. The communication terminal may choose, and/or the network may allow the communication terminal, to avoid entering the power saving mode for a specified or desired period of time, or until further notice.

In the embodiment where the inventive method is performed in the communication terminal, the exchanging of data may comprise periodically sending an amount of data to the network node. This data may preferably be a small amount of data in order to not use more resources than necessary to keep the terminal connected. The data may e.g. be some sort of dummy data. The data may e.g. be a ping or the like. The terminal may e.g. send the amount of data shortly before the timer expires such that the timer is reset, and then be sent again before the timer is about to expire the next time and so on for as long as it is desired to keep the terminal connected. Additionally or alternatively, the exchanging data may comprise periodically receiving an amount of data from the network, e.g. the network node. This data may preferably be a small amount of data in order to not use more resources than necessary to keep the terminal connected. The data may e.g. be some sort of dummy data. The data may e.g. be a ping or the like. The terminal may e.g. receive the amount of data shortly before the timer expires such that the timer is reset, and then be sent again before the timer is about to expire the next time and so on for as long as it is desired to keep the terminal connected.

If the inventive method is performed in the terminal, the method step of obtaining an indication may comprise receiving a command inputted into the communication terminal by a user of the communication terminal. A user of the terminal may e.g. input a command to the terminal via an input unit such as a touch screen or keypad. The command may e.g. instruct the terminal to stay connected/avoid power saving mode until a stop command is inputted or during a predetermined period of time. Alternatively or additionally, the obtaining an indication may comprise any other such indication, such as to avoid entering the power saving mode during a certain time of day or week, e.g. during regular office hours, or in a certain geographical area as determined e.g. by a positioning application of the terminal, e.g. at the office or at home, or when the terminal is connected to a certain communication system, e.g. in accordance with a WCDMA, LTE or WLAN communication standard.

If the inventive method is performed in the terminal, the method step of allowing a scheme may comprise setting up the scheme in response to the obtained indication. The terminal may thus set up the scheme of data exchange in order to prevent the timer from expiring. The scheme may e.g. comprise sending an amount of data periodically to the network node. The period is preferably set in relation to the time period of the timer from start to expiry of the timer, such that an amount of data is scheduled to be sent before the expiry of the timer, every time the timer is about to expire, thus resetting the timer.

If the inventive method is performed in the network, the exchanging data may comprise periodically receiving an amount of data from the communication terminal. The network, or a network node of the network, may then e.g. be on the receiving side of the amount of data sent by the terminal as discussed above. This data may preferably be a small amount of data in order to not use more resources than necessary to keep the terminal connected. The data may e.g. be some sort of dummy data. The data may e.g. be a ping or the like. The terminal may e.g. send the amount of data shortly before the timer expires such that the timer is reset, and then be sent again before the timer is about to expire the next time and so on for as long as it is desired to keep the terminal connected. Additionally or alternatively, the exchanging data may comprise periodically sending an amount of data to the communication terminal. This data may preferably be a small amount of data in order to not use more resources than necessary to keep the terminal connected. The data may e.g. be some sort of dummy data. The data may e.g. be a ping or the like. The node may e.g. send the amount of data shortly before the timer of the terminal expires such that the timer is reset, and then be sent again before the timer is about to expire the next time and so on for as long as it is desired to keep the terminal connected.

If the inventive method is performed in the network, the obtaining of indication may comprise receiving a message from the communication terminal, which message comprises a request for allowing the communication terminal to avoid entering the power saving mode. In this way the terminal may indicate to the network that the terminal intends to avoid entering the power saving mode and/or ask permission from the network to avoid entering the power saving mode. Alternatively, the obtaining an indication may e.g. comprise the network, e.g. the network node, noticing that the terminal appears to periodically send pings or dummy data in order to avoid entering the power saving mode. No specific message informing the network may thus be required for the network to obtain the indication.

If the inventive method is performed in the network, the allowing of a scheme may comprise determining whether the communication terminal is authorised to avoid entering the power saving mode by means of the scheme. Whether or not the terminal is authorised may e.g. depend on the subscription of the terminal. It may e.g. be required to pay extra money to be allowed to avoid entering the power saving mode since this may take up more resources of the network, e.g. some sort of premium subscription may be needed. Alternatively or additionally, the authorisation may be dependent on whether the network currently has the resources to spare. If the terminal is determined not to be authorised, the network may choose not to allow the scheme and may signal this to the terminal. If the network has noticed that the terminal is avoiding entering into the power saving state while not being allowed to do so, the network may choose to disconnect the terminal or to force the terminal into the power saving mode.

The power saving mode may be in accordance with Fast Dormancy or other procedure for Radio Resource Control, RRC, state switch. Typically, the power saving mode disconnects the terminal at least partially from the network in order to reduce the power consumption of receiver and transmitter etc. The power saving mode may comprise switching the communication terminal to IDLE state or to UTRAN Routing Area Paging Channel, URA-PCH, e.g. from CELL-FACH or CELL-DCH.

The communication system may be in accordance with any communication standard such as in accordance with a Wideband Code Division Multiple Access, WCDMA, communication standard. Other examples include, but are not limited to, Global System for Mobile Communication (GSM), Universal Mobile Telecommunication System (UMTS), General Packet Radio Service (GPRS), Long Term Evolution (LTE), Ultra Mobile Broadband (UMB), High-Speed Packet Access (HSPA), ad hoc networks, and Worldwide Interoperability for Microwave Access (WiMAX.

FIG. 1 is a schematic flow chart illustrating an embodiment of a method of the present invention, for increasing performance in a radio communication system. As discussed above, the method may be performed in the communication terminal and/or in the network, e.g. in a network node.

In step 101, an indication is obtained that it is desirable to avoid that a communication terminal of the system enters a power saving mode. The power saving mode is entered if a timer of the communication terminal expires. It may be desired to avoid the power saving mode e.g. when a low latency is desired such as at high frequency communications etc. as discussed above. In step 102, a scheme of scheduled periodic exchange of data between the communication terminal and a node of a network of the system is allowed. The scheme is intended to periodically reset the timer before its expiry by means of said periodic exchange of data, as discussed above. In step 103, data between the communication terminal and the network node is exchanged over a radio interface in accordance with the scheme. By means of the exchange of data, sending and/or receiving data, entry of the communication terminal into the power saving mode may be prevented, as discussed above.

Figure 2:
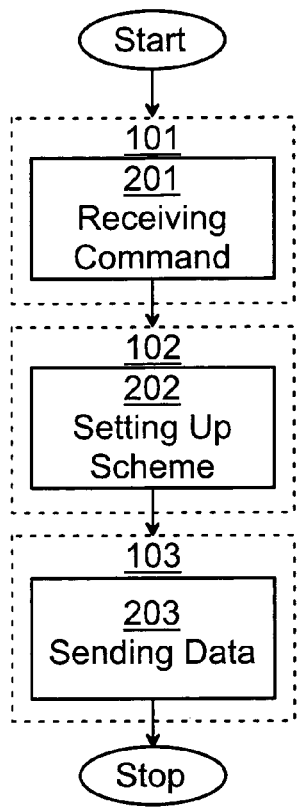
FIG. 2 is a schematic flow chart illustrating another embodiment of a method of the present invention.

FIG. 2 schematically illustrates an embodiment of the present invention where the method is performed in the communication terminal.

According to this method, the obtaining 101 of an indication that it is desirable to avoid that a communication terminal of the system enters a power saving mode comprises receiving 201 a command which has been inputted into the terminal by a user of said terminal. The user of the terminal may e.g. input a command to the terminal via an input unit such as a touch screen or keypad. The command may e.g. instruct the terminal to stay connected/avoid power saving mode until a stop command is inputted or during a pre-determined period of time. Alternatively or additionally, the obtaining an indication may comprise any other such indication, such as to avoid entering the power saving mode during a certain time of day or week, e.g. during regular office hours, or in a certain geographical area as determined e.g. by a positioning application of the terminal, e.g. at the office or at home, or when the terminal is connected to a certain communication system, e.g. in accordance with a WCDMA, LTE, GSM, GPRS or WLAN communication standard, preferably a WCDMA or LTE standard.

The allowing 102 of a scheme of scheduled periodic exchange of data between the communication terminal and a node of a network of the system may comprise setting up 202 the scheme in response to the obtained 101, and received 201, indication. The terminal may set up the scheme of data exchange in order to prevent the timer from expiring. The scheme may e.g. comprise sending an amount of data periodically to the network node. The period may be set in relation to the time period of the timer from start to expiry of the timer, such that an amount of data is scheduled to be sent before the expiry of the timer, every time the timer is about to expire, thus resetting the timer.

The exchanging 103 of data between the communication terminal and the network node over a radio interface in accordance with the scheme may comprise periodically sending 203 an amount of data to the network node. This data may be a small amount of data in order to not use more resources than necessary to keep the terminal connected. The data may e.g. be some sort of dummy data. The data may e.g. be a ping or the like. The terminal may e.g. send the amount of data shortly before the timer expires such that the timer is reset, and then be sent again before the timer is about to expire the next time, and so on for as long as it is desired to keep the terminal connected/avoid the terminal entering the power saving mode.

Figure 3:
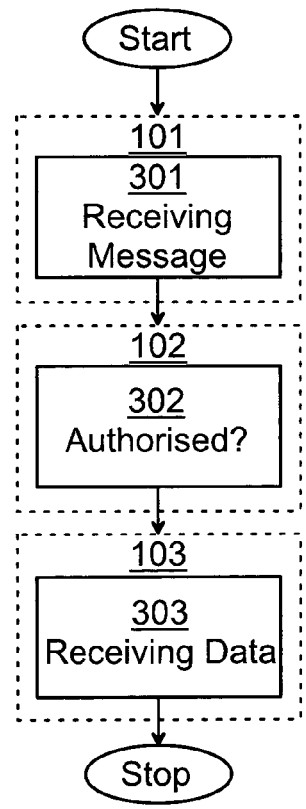
FIG. 3 is a schematic flow chart illustrating another embodiment of a method of the present invention.

FIG. 3 schematically illustrates an embodiment of the present invention where the method is performed in a network node of the network.

According to this embodiment, the obtaining 101 of an indication that it is desirable to avoid that a communication terminal of the system enters a power saving mode comprises receiving 301 a message from the communication terminal, which message comprises a request for allowing the communication terminal to avoid entering the power saving mode. Thus, the terminal may indicate to the network that the terminal intends to avoid entering the power saving mode and/or ask permission from the network to avoid entering the power saving mode. Alternatively, the obtaining of an indication may e.g. comprise the network, e.g. the network node, noticing that the terminal appears to periodically send pings or dummy data in order to avoid entering the power saving mode. No specific message informing the network may thus be required for the network to obtain the indication.

The allowing 102 of a scheme of scheduled periodic exchange of data between the communication terminal and a node of a network of the system may comprise determining 302 whether the communication terminal is authorised to avoid entering the power saving mode by means of the scheme. Whether or not the terminal is authorised may e.g. depend on the subscription of the terminal. It may e.g. be required to pay extra money to be allowed to avoid entering the power saving mode since this may take up more resources of the network, e.g. some sort of premium subscription may be needed. Alternatively or additionally, the authorisation may be dependent on whether the network currently has the resources to spare. If the terminal is determined not to be authorised, the network may choose not to allow the scheme and may signal this to the terminal. If the network has noticed that the terminal is avoiding entering into the power saving state while not being allowed/authorised to do so, the network may choose to disconnect the terminal or to force the terminal into the power saving mode.

The exchanging 103 of data between the communication terminal and the network node over a radio interface in accordance with the scheme may comprise periodically receiving 303 an amount of data from the communication terminal. The network, such as the network node of the network, may thus e.g. be on the receiving side of the amount of data sent 203 by the terminal as discussed above. This data may preferably be a small amount of data in order to not use more resources than necessary to keep the terminal connected. The data may e.g. be some sort of dummy data. The data may e.g. be a ping or the like. The terminal may e.g. send the amount of data shortly before the timer expires such that the timer is reset, and then be sent again before the timer is about to expire the next time and so on for as long as it is desired to keep the terminal connected.

Figure 4:
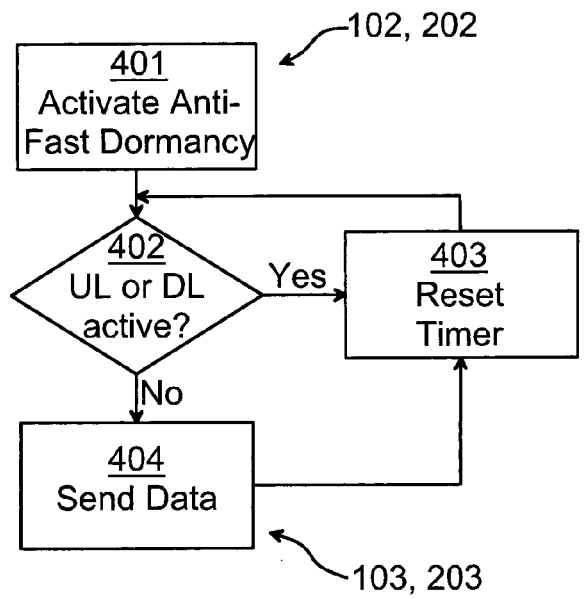
FIG. 4 is a schematic flow chart illustrating another embodiment of a method of the present invention.

FIG. 4 illustrates an embodiment of the inventive method where an anti-fast dormancy state/mode is activated 401 in the terminal in order to prevent the terminal from switching to IDLE or URA-PCH as part of an active fast dormancy procedure. This activation 401 may be regarded as being a part of the setting up 202 of the scheme as discussed in relation to FIG. 2. As part of the regular fast dormancy procedure, the timer is reset 403 if signaling occurs 402 in the uplink or downlink direction, i.e. if UL and/or DL is active 402. However, if the UL or DL is not active 402, the terminal will enter the power saving mode, e.g. switch to IDLE or URA-PCH in accordance with the fast dormancy procedure, upon expiry of the timer. In order to prevent this, the terminal sends 404 data, e.g. a ping, before the expiry of the timer, whereby the timer is reset 403. For as long as the UL and DL remains not active 402, the terminal may continue to send 404 data to reset 403 the timer every time the timer is about to expire. This sending 404 of data may be regarded as being part of the sending 203 of data discussed in relation to FIG. 2.

Figure 5:
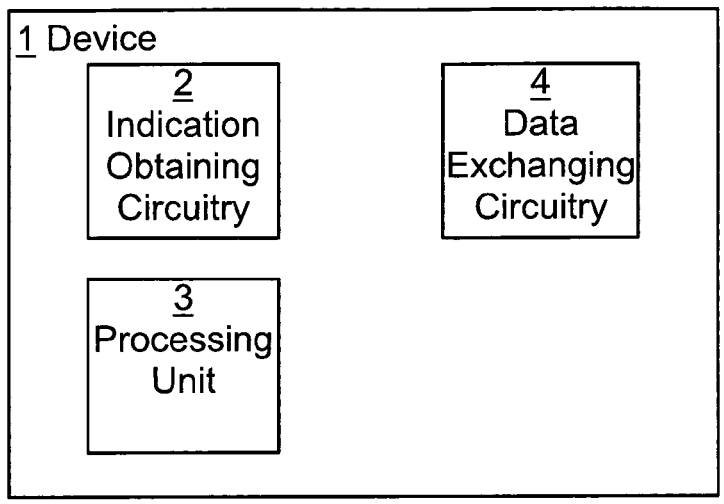
FIG. 5 is a schematic diagram illustrating an embodiment of a device of the present invention.

FIG. 5 illustrates an embodiment of a device 1 for increasing performance in a radio communication system. The device 1 may e.g. be used for performing the method of any of the method embodiments of FIGS. 1-4.

The device 1 may comprise indication obtaining circuitry 2 configured for obtaining 101 an indication that it is desirable to avoid that a communication terminal of the system enters a power saving mode. The communication terminal may be configured for entering said power saving mode upon expiry of a timer of said communication terminal. The indication obtaining circuitry 2 may e.g. be an input unit, such as a touch screen or a keypad, by means of which a user may input a command into the device 1, which command may be or be part of the obtained 101 indication. The indication obtaining circuitry 2 may alternatively or additionally e.g. be a receiver such as a radio receiver by means of which the device may obtain 101 the indication via a radio interface. The device 1 may also comprise a processing unit 3 configured for allowing 102 a scheme of scheduled periodic exchange of data between the communication terminal and a node of a network of the system. The exchange of data may be intended to periodically reset the timer before its expiry by means of said periodic exchange of data. The processing unit 3 may e.g. be a central processing unit (CPU) comprising one or a plurality of microprocessors, or other suitable device(s) with computing capabilities could be used, e.g. an application specific integrated circuit (ASIC), a field programmable gate array (FPGA), a complex programmable logic device (CPLD), etc. The processing unit 3 may be configured to be able to execute appropriate software/computer program stored in associated memory (not shown) for procuring required functionality. The computer program may be a computer program which when run on the processing unit 3 causes the device 1 to perform an embodiment of the method of the present invention. The device 1 may further comprise data exchange circuitry 4 configured for exchanging 103 data between the communication terminal and the network node over a radio interface in accordance with the scheme. The data exchange circuitry 4 may e.g. be a radio transmitter or receiver.

Figure 6:
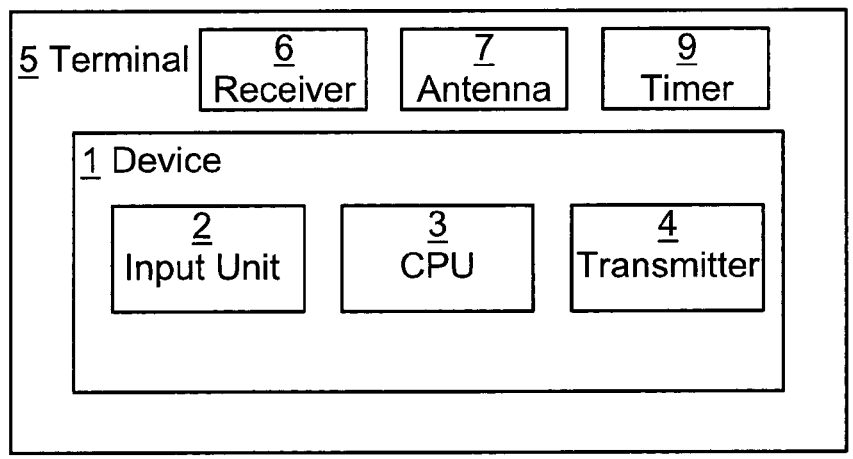
FIG. 6 is a schematic diagram illustrating an embodiment of a communication terminal of the present invention.

FIG. 6 illustrates a communication terminal 5 comprising a device 1, e.g. as discussed in relation to FIG. 5. The device 1 comprises an input unit 2 as at least part of the indication obtaining circuitry 2, such as a touch screen or a keypad, by means of which a user may input a command into the device 1, which command may be, or be part of, the obtained 101 indication. The device 1 also comprises a CPU 3 as at least part of the processing unit 3, as discussed in relation to FIG. 5. The device 1 comprises a transmitter 4 as at least part of the data exchange circuitry 4 for sending 203 data to reset the timer 9 of the terminal 5. The timer 9 is as discussed above. If the timer 9 expires, the power saving mode is entered, why the timer 9 is reset, e.g. by means of pings sent by the transmitter 4, in accordance with the present invention. In addition to the device 1 and the timer 9, the terminal 5 may typically comprise a receiver 6 and an antenna 7 for communication over a radio interface. The transmitter 4 of the device 1 may also be used by the terminal 5 for other communication than the radio communication within the present invention, just as the CPU 3 and input unit 2 of the device 1 may additionally function as the regular CPU and input unit of the terminal 5.

Figure 7:
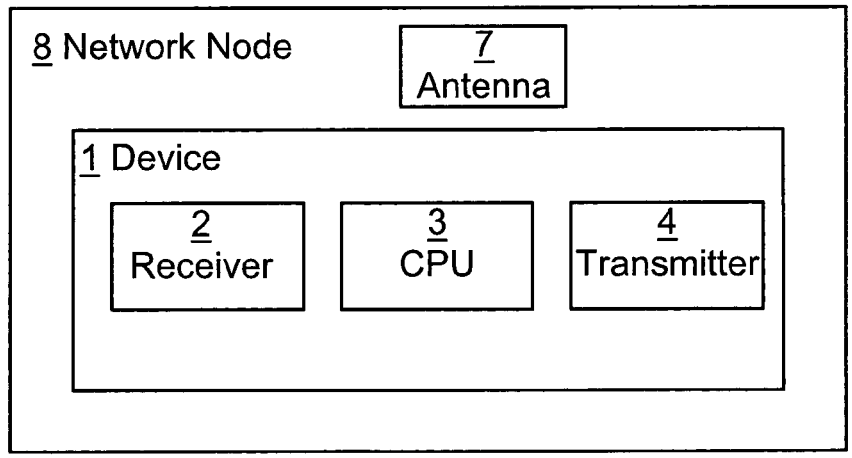
FIG. 7 is a schematic diagram illustrating an embodiment of a network node of the present invention.

FIG. 7 illustrates a network node 8 comprising a device 1, e.g. as discussed in relation to FIG. 5. The device 1 comprises a radio receiver 2, as at least part of the indication obtaining circuitry 2, by means of which the device 1 may obtain 101 the indication via a radio interface. The device 1 also comprises a CPU 3 as at least part of the processing unit 3, as discussed in relation to FIG. 5. The device 1 may comprise a transmitter 4 as at least part of the data exchange circuitry 4 for sending data to the terminal 5 in order to reset 403 the timer 9 of the terminal 5, and/or the data exchange circuitry 4 may comprise the receiver 2 configured to receive data sent 203 from the terminal 5 in order to reset 403 the timer 9. The receiver 2 may thus form part of both the indication obtaining circuitry 2 and the data exchange circuitry 4, in a specific embodiment of the network node. The network node 8 may comprise an antenna 7 for facilitating radio communication. The antenna 7 may be associated with the receiver 2 and/or the transmitter 4. The receiver 2, the CPU 3 and/or the transmitter 4 may additionally function as the regular receiver, CPU and/or transmitter of the network node 8.

Figure 8:
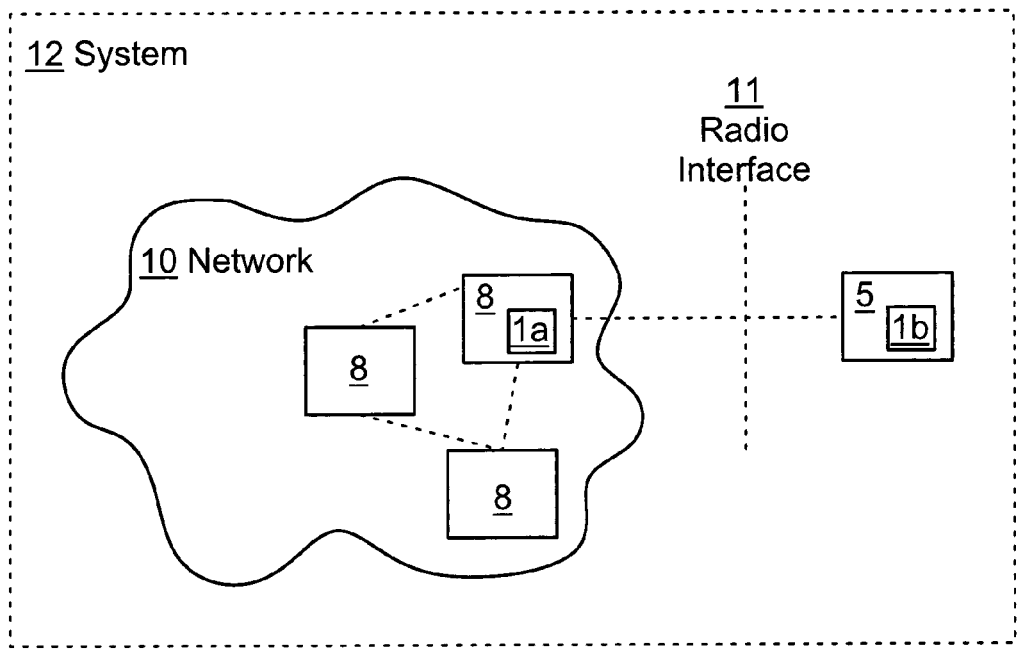
FIG. 8 is a schematic diagram illustrating an embodiment of a communication system of the present invention.

FIG. 8 illustrates an embodiment of a communication system 12 of the present invention. The system 12 comprises a network 10, and at least one communication terminal 5 e.g. in accordance with the discussion in relation to FIG. 5. The communication system 12 may be in accordance with any communication standard, such as in accordance with a Wideband Code Division Multiple Access, WCDMA, communication standard. Other examples include, but are not limited to, Global System for Mobile Communication (GSM), Universal Mobile Telecommunication System (UMTS), General Packet Radio Service (GPRS), Long Term Evolution (LTE), Ultra Mobile Broadband (UMB), High-Speed Packet Access (HSPA), ad hoc networks, and Worldwide Interoperability for Microwave Access (WiMAX). The network 10 may comprise a plurality of network nodes 8. Any of the network nodes 8 may e.g. be a Radio Base Station (RBS), a Base Transceiver Station (BTS) of GSM, a Node B or evolved Node B (eNode B), a radio control node such as a Radio Network Control (RNC) or a Base Station Controller (BSC), or a core network (CN) node, preferably a Node B or eNode B. The terminal 5 is connected to one of the network nodes 8, as indicated by the dashed line, over a radio interface 11. As discussed above, either or both of the communication terminal 5 and the network node 8 to which the terminal 5 is connected may comprise the device 1 discussed above (in FIG. 8, two devices 1 are shown, called 1a and 1b). Thus, in one embodiment of the system 12, the network node 8 comprises a device 1a for increasing performance in the radio communication system 12. In another embodiment of the system 12, the terminal 5 comprises a device 1b for increasing performance in the radio communication system 12. In another embodiment of the system 12, the network node 8 comprises a device 1a for increasing performance in the radio communication system 12 and the terminal 5 comprises a device 1b for increasing performance in the radio communication system 12.

Figure 9:
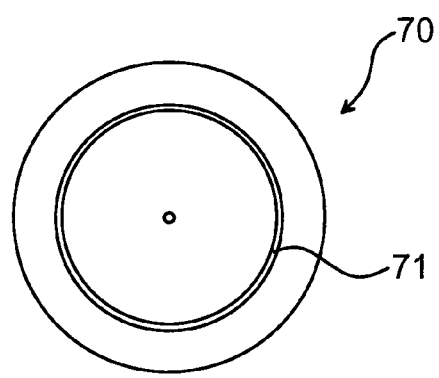
FIG. 9 is a schematic diagram illustrating an embodiment of a computer program product of the present invention.

FIG. 9 illustrates a computer program product 70 or a computer readable medium 70 comprising a computer program 71 or computer-executable components 71. The computer program/computer-executable components 71 may be configured to cause a device 1, e.g. as discussed above, for increasing performance in a radio communication system 12 to perform an embodiment of the method of the present invention. The computer program/computer-executable components 71 may be run on the processing unit 3 of the device 1 for causing the device to perform the method. The computer program product/computer readable medium 70 may e.g. be comprised in a storage unit or memory comprised in the device 1 and associated with the processing unit 3. Alternatively, the computer program product/computer readable medium 70 may be, or be part of a separate, e.g. mobile, storage means, such as a computer readable disc, e.g. CD or DVD or hard disc/drive, or a solid state storage medium, e.g. a RAM or Flash memory.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method in a communication terminal configured for operation in a radio communication system, said method comprising:
   determining whether or not the communication terminal should avoid entering a power saving mode associated with extended periods of radio inactivity; and
   for a given period of radio inactivity:
      in response to determining that the communication terminal should not avoid entering the power saving mode, allowing expiry of an inactivity timer and entering the power saving mode upon the expiry; and
      in response to determining that the communication terminal should avoid entering the power saving mode, preventing expiry of the inactivity timer and thereby preventing entry into the power saving mode;
   wherein preventing expiry of the inactivity timer comprises periodically exchanging data between the communication terminal and a network node of the radio communication system.

2. The method of claim 1, wherein entering the power saving mode comprises switching the communication terminal to IDLE state or to UTRAN Routing Area Paging Channel, URA-PCH.

3. The method of claim 1, wherein determining whether or not the communication terminal should avoid entering the power saving mode comprises determining whether or not the communication terminal has received control signaling received from the radio communication system indicating that the communication terminal should avoid entering the power saving mode.

4. The method of claim 1, wherein determining whether or not the communication terminal should avoid entering the power saving mode comprises determining whether or not a user of the communication terminal has inputted a command indicating that the power saving mode should be avoided.

5. The method of claim 1, wherein determining whether or not the communication terminal should avoid entering the power saving mode comprises determining whether one or more of a current time, day, or location of the communication terminal corresponds with one or more defined times, days or locations for which the power saving mode should be avoided.

6. The method of claim 1, further comprising, responsive to determining that the power saving mode should be avoided, continuing to avoid the power saving mode until the occurrence of at least one of the following: a predetermined period of time ends, or a user command is inputted to the terminal.

7. A communication terminal configured for operation in a radio communication system, said communication terminal comprising:
   communication circuitry configured to communicate with a network node in the radio communication system; and
   processing circuitry operatively associated with the communication circuitry and configured to:
      determine whether or not the communication terminal should avoid entering a power saving mode associated with extended periods of radio inactivity; and
      for a given period of radio inactivity:
         in response to determining that the communication terminal should not avoid entering the power saving mode, allowing expiry of an inactivity timer and entering the power saving mode upon the expiry; and
         in response to determining that the communication terminal should avoid entering the power saving mode, preventing expiry of the inactivity timer and thereby preventing entry into the power saving mode;
      wherein the processing circuitry is configured to prevent expiry of the inactivity timer by periodically exchanging data between the communication terminal and the network node.

8. The communication terminal of claim 7, wherein, to enter the power saving mode, the processing circuitry is configured to switch the communication terminal to IDLE state or to UTRAN Routing Area Paging Channel, URA-PCH.

9. The communication terminal of claim 7, wherein the processing circuitry is configured to determine whether or not the communication terminal should avoid entering the power saving mode by determining whether or not the communication terminal has received control signaling from the radio communication system indicating that the communication terminal should avoid entering the power saving mode.

10. The communication terminal of claim 7, wherein the processing circuitry is configured to determine whether or not the communication terminal should avoid entering the power saving mode by determining whether or not a user of the communication terminal has inputted a command to the communication terminal indicating that the power saving mode should be avoided.

11. The communication terminal of claim 7, wherein the processing circuitry is configured to determine whether or not the communication terminal should avoid entering the power saving mode by determining whether one or more of a current time, day, or location of the communication terminal corresponds with one or more defined times, days or locations for which the power saving mode should be avoided.

12. The communication terminal of claim 7, wherein, in response to determining that the power saving mode should be avoided, the processing circuitry is configured to continue avoiding the power saving mode until the occurrence of at least one of the following: a predetermined period of time ends, or a user command is inputted to the terminal.

13. A method in a network node configured for operation in a radio communication system, said method comprising:
   determining whether or not a communication terminal operating in the radio communication system should avoid entering a power saving mode associated with extended periods of radio inactivity; and
   for a given period of radio inactivity:
      in response to determining that the communication terminal should not avoid entering the power saving mode, allowing expiry of an inactivity timer and entering the power saving mode upon the expiry; and
      in response to determining that the communication terminal should avoid entering the power saving mode, preventing expiry of the inactivity timer and thereby preventing entry into the power saving mode;
   wherein preventing expiry of the inactivity timer comprises periodically exchanging data between the network node and the communication terminal.

14. The method of claim 13, wherein the power saving mode comprises switching the communication terminal to IDLE state or to UTRAN Routing Area Paging Channel, URA-PCH.

15. The method of claim 13, wherein determining whether or not the communication terminal should avoid entering the power saving mode comprises making the determination in dependence on any one or more of the following: subscription information associated with the communication terminal; resource availability within the radio communication system; and a known or expected length of time during which the communication terminal will avoid entering the power saving mode.

16. The method of claim 13, wherein determining whether or not the communication terminal should avoid entering the power saving mode comprises determining whether one or more of a current time, day, or location of the communication terminal corresponds with one or more defined times, days or locations for which the power saving mode should be avoided.

17. A network node configured for operation in a radio communication system, said network node comprising:
  communication circuitry configured to communicate with a communication terminal configured for operation in the radio communication system; and
  processing circuitry operatively associated with the communication circuitry and configured to:
    determine whether or not the communication terminal should avoid entering a power saving mode associated with extended periods of radio inactivity; and
    for a given period of radio inactivity:
      in response to determining that the communication terminal should not avoid entering the power saving mode, allowing expiry of an inactivity timer and entering the power saving mode upon the expiry; and
      in response to determining that the communication terminal should avoid entering the power saving mode, preventing expiry of the inactivity timer and thereby preventing entry into the power saving mode;
    wherein the processing circuitry is configured to prevent expiry of the inactivity timer by periodically exchanging data between the communication terminal and the network node.

18. The network node of claim 17, wherein, to enter the power saving mode, the processing circuitry is configured to switch the communication terminal to IDLE state or to UTRAN Routing Area Paging Channel, URA-PCH.

19. The network node of claim 17, wherein the processing circuitry is configured to determine whether or not the communication terminal should avoid entering the power saving mode by making the determination in dependence on any one or more of the following: subscription information associated with the communication terminal; resource availability within the radio communication system; and a known or expected length of time during which the communication terminal will avoid entering the power saving mode.

20. The network node of claim 17, wherein the processing circuitry is configured to determine whether or not the communication terminal should avoid entering the power saving mode by determining whether one or more of a current time, day, or location of the communication terminal corresponds with one or more defined times, days or locations for which the power saving mode should be avoided.

* * * * *